United States Patent
Wu et al.

(10) Patent No.: US 8,498,233 B2
(45) Date of Patent: Jul. 30, 2013

(54) METHOD AND APPARATUS FOR MULTICAST TREE MANAGEMENT IN MULTI-HOP RELAY COMMUNICATION SYSTEM

(75) Inventors: Mingquan Wu, Princeton Junction, NJ (US); Hang Liu, Yardley, PA (US)

(73) Assignee: Thomson Licensing, Issy les Moulineaux (FR)

( * ) Notice: Subject to any disclaimer, the term of this patent is extended or adjusted under 35 U.S.C. 154(b) by 196 days.

(21) Appl. No.: 12/988,961

(22) PCT Filed: Apr. 22, 2008

(86) PCT No.: PCT/US2008/005169
§ 371 (c)(1),
(2), (4) Date: Oct. 21, 2010

(87) PCT Pub. No.: WO2009/131555
PCT Pub. Date: Oct. 29, 2009

(65) Prior Publication Data
US 2011/0051651 A1   Mar. 3, 2011

(51) Int. Cl.
*H04H 20/71*   (2008.01)
(52) U.S. Cl.
USPC ............................................ 370/312; 370/432
(58) Field of Classification Search
USPC .................... 370/312, 256, 338, 408, 432
See application file for complete search history.

(56) References Cited

U.S. PATENT DOCUMENTS

| | | | |
|---|---|---|---|
| 8,126,470 B2 * | 2/2012 | Zheng ........................... | 455/446 |
| 2006/0168341 A1 * | 7/2006 | Keller-Tuberg ............... | 709/242 |
| 2007/0097945 A1 * | 5/2007 | Wang et al. ................... | 370/349 |
| 2008/0291847 A1 * | 11/2008 | Zheng ........................... | 370/255 |
| 2009/0067348 A1 * | 3/2009 | Vasseur et al. ................ | 370/256 |

FOREIGN PATENT DOCUMENTS

| | | |
|---|---|---|
| EP | 1315329 A | 5/2003 |
| EP | 1814269 A | 8/2007 |
| WO | WO2007070056 | 6/2007 |
| WO | WO 2007070056 | 6/2007 |
| WO | WO2007073362 | 6/2007 |
| WO | WO 2007073362 | 6/2007 |

OTHER PUBLICATIONS

Chindapol et al., "Connection Management for Relay Path Configuration", IEEE C80216j-07/241r4, the IEEE 802.16 WirelessMAN, Mar. 15, 2007.

(Continued)

*Primary Examiner* — Brian D Nguyen
(74) *Attorney, Agent, or Firm* — Robert D. Shedd; Jeffrey M. Navon; Catherine A. Cooper (57) ABSTRACT

A method is described including receiving multiple requests for a multicast service, generating parameters associated with binding paths to a multicast tree to provide the requested multicast service and binding the paths to the multicast tree. Also described is a method including receiving a request for multicast service with a multicast tree identification, binding the multicast tree identification to paths satisfying a quality of service level for the multicast tree identification and transmitting a first message to a multi-hop relay base station. A method is described including receiving requests to delete multicast service from client devices served by multiple paths, generating parameters associated with unbinding paths from a multicast tree to delete the multicast service and unbinding the paths from the multicast tree. Also described is a method for unbinding of paths from the perspective of the relay station.

24 Claims, 11 Drawing Sheets

OTHER PUBLICATIONS

Hang et al., Connection Management for Multicast and Broadcast Services (MBS)< IEEE C80216j-07/272, IEE 802.16 WirelessMAN, Apr. 6, 2007.

Hang et al., "Connection Management for Multicast and Broadcast Services (MBS)", IEEE C80216j-07/272, IEEE 802.16 Wireless-MAN, Apr. 6, 2007.

Hai-Ying Wang, et al., "QoS-Aware Multicast Balance Tree Routing Algorithm on EPFTS", Communications and Information Technologies, 2007. ISCIT '07 International Symposium Oct. 1, 2007, pp. 632-637.

Cain, B. et al., "Internet Group Management Protocol, Version 3", RFC 3376, Internet Enginieering Task Force, Oct. 1, 2002.

Chakrabarti et al., "A Case for Tree Evolution in QoS Multicasing" Computer Communications, Elsevier Science Publishers BV, Amsterdam, NL vol. 29, No. 11, Jul. 26, 2006, pp. 2004-2025.

International Search Report for PCT/US2008/005169 dated Apr. 11, 2008.

Ballardie, T., et al. "Core based trees (CBT)," (1993), ACM SIGCOMM Computer Communication Review, 23(4), 85-95.

\* cited by examiner

METHOD AND APPARATUS FOR MULTICAST TREE MANAGEMENT IN MULTI-HOP RELAY COMMUNICATION SYSTEM

This application claims the benefit, under 35 U.S.C. §365 of International Application PCT/US08/05169, filed Apr. 22, 2008, which was published in accordance with PCT Article 21(2) on Oct. 29, 2009 in English.

FIELD OF THE INVENTION

The present invention relates to wireless multi-hop relay communications systems and, in particular, to multicast tree management for wireless multi-hop relay communication systems.

BACKGROUND OF THE INVENTION

Multi-hop wireless networks (including mobile wireless multi-hop relay communication networks/systems) are emerging as a promising technology that has applications in metro-area Internet access. As used herein, "/" denotes alternative names for the same or similar components or structures. That is, a "/" can be taken as meaning "or" as used herein. In the present invention, infrastructure multi-hop wireless relay networks are considered. Infrastructure multi-hop wireless relay networks consist of one or more multi-hop relay base stations (MR-BSs), relay nodes/stations (RS) and mobile stations (MS)/end devices. Relay nodes are part of the network infrastructure and are connected to base stations to form a backhaul multi-hop wireless network. A base station may connect to other networks such as the Internet. The mobile stations/end devices associate with/connect to/attach to a MR-BS or RS to obtain network access.

Figure 1:
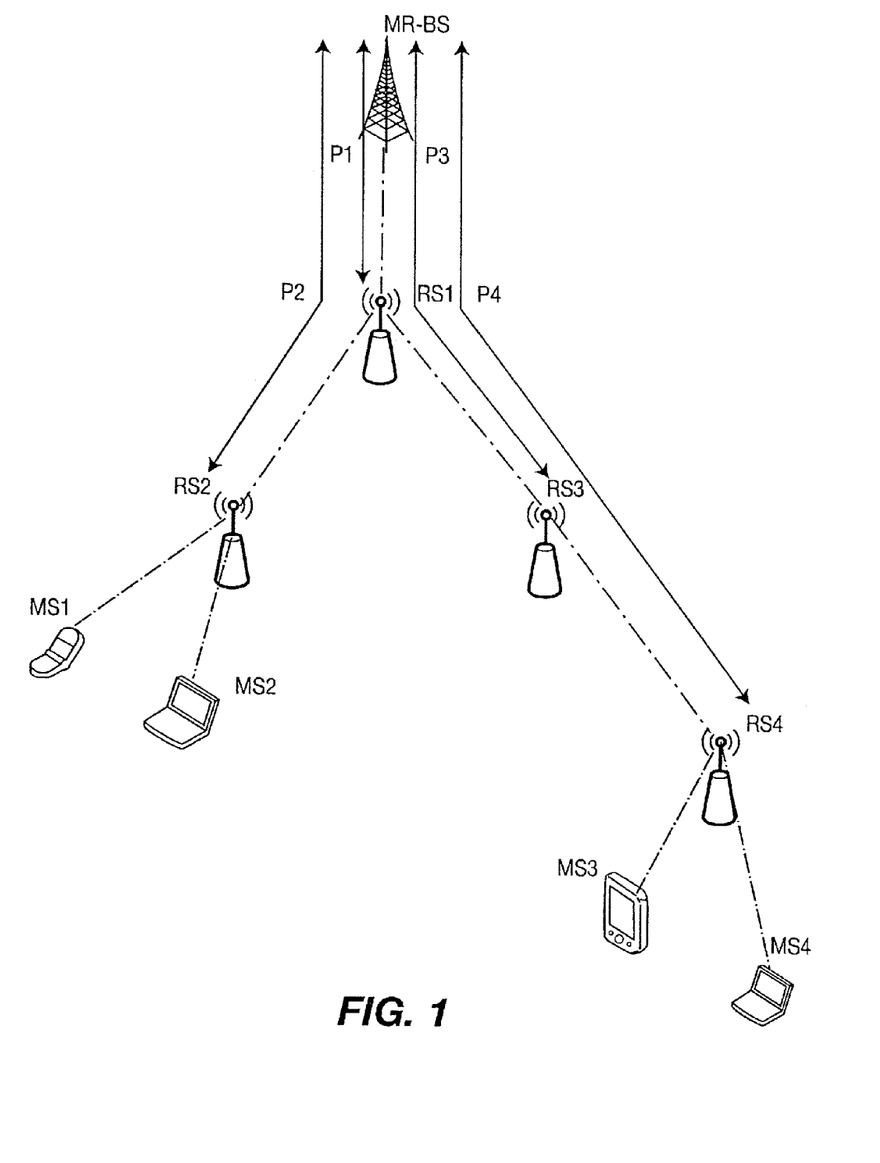
FIG. 1 is a schematic diagram of an exemplary multi-hop relay communication system.

In the prior art, a scheme to establish a unicast path between MR-BS and a RS was described. Referring now to FIG. 1 which is a schematic diagram of an exemplary multi-hop relay communication system, when RS1 enters the network, after conducting the initial ranging, a path P1 is established between MR-BS and RS1, P1={MR-BS, RS1}. FIG. 1 will be used to illustrate both how the prior art operated and how the present invention operates. A path identification (ID) is assigned to P1. When RS2 enters the network, a path P2 is established between MR-BS and RS2, P2={P1, RS2}. The path information is communicated to all the relay nodes (RSs) along the path. When MS1 enters the network, after the initial ranging, MR-BS knows that MS1 is associated with RS2, MR-BS binds MS1's basic and primary management connection identification (CID) to/with P2. MR-BS also notifies RS1 and RS2 to bind MS1's basic and primary management CID with/to P2. All the unicast traffic flows that start or end with MS1 have their CIDs bound with/to P2. For all the RSs in the system, there is a unique path that leads from MR-BS to each RS. For each MS in the system, their basic and primary management CID is bound to a path. For those MSs that connect directly to the MR-BS, P0={MR-BS} is defined and their CID is then bound to P0. It should be noted in the unicast scheme that a path can be bound to multiple CIDs, but each OD is only bound to one path.

Multicast and broadcast services (MBS) are very important for mobile wireless networks. In single-hop wireless communication systems, such as IEEE 802.16e, MBSs are associated With multicast and broadcast service flows. A multicast and broadcast service flow is not dedicated to a specific end device/mobile station/mobile device. For ease of notation, end devices are denoted as mobile stations (MSs) herein but it should be noted that end devices also include laptops, PDAs, cell phones, mobile terminals and any other such mobile devices. If one or more MSs send a request to the base station (BS) in order to receive multicast service, a multicast connection is instantiated for a multicast service flow, a connection identification (CID) number is assigned to this multicast connection. The BS then creates a multicast traffic connection with each MS requesting the multicast and broadcast service using the same CID. Each multicast service data unit (SDU) is transmitted only once by the BS, and all MSs requesting the multicast service are able to receive the SDU. Multicast SDUs are sent directly from the BS to the MSs, no multicast distribution tree needs to be established for single hop wireless communication systems.

When there are no relay stations, a request to add, change and delete a service between a base station and a mobile station is accomplished by the DSx signaling messages, DSx messages include DSA, DSC and DSD messages. When relay stations are added, the DSx messages are extended for communication between multihop relay base stations (MR-BS) and relay stations (RS), and between two relay stations (RS). The extension is transparent to the mobile stations (MS), so a MS does not understand the extended DSx messages. For clarification, an "*" is added at the end of a DSx message to indicate that this is a extended DSx message. A MR-BS and RS station can understand/interpret both DSx messages and extended DSx messages, represented by DSx*, but a mobile station (MS) can only understand DSx messages.

Multicast offers efficient utilization of network resources to deliver data from a source to multiple destination nodes. In a wireless multi-hop relay (MR) system, one or more relay stations (RS) may exist between a multi-hop relay base station (MR-BS) and a MS. When a MS associated with/attached to/connected to a RS joins a multicast application, multicast SDUs/packets/frames need to be forwarded from the MR-BS to the RS with which the MS is associated. Note that it is possible that only a subset of nodes in a wireless MR system may join a particular multicast service/group to transmit and receive the multicast SDUs for this multicast service. A multicast service/group has its own multicast connection ID (MCID) for communications among the multicast service members. One way to transmit SDUs/packets/frames from a MR-BS to one or more RSs is to broadcast the multicast SDUs/packets/frames to every RS in the network no matter whether they need to receive the packets/frames/SDUs or not. Another approach to solve the problem of how to transmit multicast SDUs/packets/frames from a MR-BS to RSs is to encapsulate multicast SDUs and unicast them individually to each of the RSs, that are associated with those MSs that have requested the multicast service. In this scheme, however, the MR-BS or the intermediate RS may need to transmit the same SDU multiple times, thus also incurring substantial cost in terms of bandwidth.

It would advantageous to have a method to establish and maintain a multicast distribution tree to distribute multicast SDUs/packets/frames along each branch of the multicast distribution tree. In this way, a multicast SDU is transmitted only once by a MR-BS to an RS and then only once by that RS to a further RS or to the MSs. The multicast SDU is transmitted only to the RSs associated with the MSs that have requested the multicast and broadcast service. Thus, the bandwidth utilization for multicast is improved.

The IP layer multicast routing protocols have been used to discover and establish the multicast tree for a multicast group in wired and wireless networks. The IP layer multicast routing protocols are based on the IP addresses. The Protocol Independent Multicast-Sparse Mode (PIM-SM) and the Protocol Independent Multicast-Dense Mode (PIM-DM) are two IP multicast routing protocols. PIM-DM employs a flooding and then pruning approach, which results in large overhead. PIM-SM employs a join/prune approach, which is more efficient in terms of network resource utilization. However, these protocols are designed for distributed and connectionless Internet communications, where the establishment and teardown of multicast tree routing is conducted by the multicast group members. In contrast, in the present invention, the establishment and teardown of multicast distribution tree routing is controlled by the base station (MR-BS).

Multicast routing protocols have also been proposed for wired or wireless mesh networks based-on layer 2 media access control (MAC) address. However, the establishment and teardown of multicast tree in these protocols is also distributively controlled by the multicast group members.

The network structure of a wireless multi-hop relay network is quite different from the wired Internet and wired or wireless mesh networks. In a multi-hop relay network, the MR-BS is a central control point. The multi-hop relay network has tree-type wireless connections with the BS as the root. The multi-hop relay network is a connection-oriented network, compared to mesh and connectionless wired or wireless networks. The SDUs/packets/frames are transmitted based on the connection ID, not the destination and source addresses as in wired or wireless mesh networks and Internet communications. The connection ID is dynamically assigned by the base station. The multicast routing protocols used for wired or wireless mesh networks and Internet communications are not applicable for a multi-hop relay network. Therefore, multicast mechanisms for wireless multi-hop relay networks are needed to establish, maintain, and tear down multicast distribution trees for efficient multicast communications using multicast connection ID.

In a multi-hop relay wireless communication network, a mobile station (MS) may connect to a MR-BS (base station) through one or more relay stations (RSs). To improve routing and data delivery efficiency, a path is established to connect the MR-BS to the MS. A path consists of the MR-BS and one or more intermediate RSs between the MR-BS and the MS. Multiple MSs may connect to the MR-BS using the same path. Each path is assigned a path_ID. When a service flow or a connection needs to be established between a MR-BS and a MS, a connection identifier (CID) is assigned to this connection. This CID is then bound to the path that connects the MS to the MR-BS so that the service flow can be activated. The binding between CID and path_ID can be updated or removed. The binding update and binding removal between CID and path_ID is accomplished by sending DSx* signals/messages along the path that connects the MR-BS and the corresponding MSs. A DSx* message includes DSA*, DSD* and DSC* signals/messages, where DS stands for dynamic service and "x" is used to denote A, D or C, where A stands for addition, D stands for deletion and C stands for change message. In the prior art, multiple CIDs can be bound, updated and removed to a single path_ID using a single DSx* message. In an earlier patent application, PU07066 filed mmddyy by the Applicants herein, a method and apparatus for establishing and maintaining a multicast tree using the existing DSx* messages was taught. In MBS services, a multicast CID (MCID) can be bound to multiple paths. The existing DSx* messages are not efficient for connection management in MBS services. For example, if a MR-BS wants to initiate a MBS for multiple MSs, or receives a MBS request from multiple MSs at about the same time, and these MSs connect to the MR-BS using different paths, it is necessary to send multiple DSA-REQ* or other DSx* messages to establish the multicast tree.

SUMMARY OF THE INVENTION

The present invention teaches two embodiments for multicast distribution tree establishment and maintenance for mobile wireless multi-hop relay communication networks, such as an IEEE 802.16 WiMax based multi-hop network. In particular, signal mechanisms and data structures are described that are maintained by the MR-BS and RSs in order to build a multicast distribution tree to efficiently distribute multicast data/content from the source (MR-BS) to all the MSs that join the multicast application in a multi-hop relay communication network. A unicast communication is a one-to-one communication between two entities. A broadcast communication is a communication between one and all other entities in the communication system. A multicast communication is a one-to-many communication between an entity and a plurality of other entities in the communication system, where the plurality of other entities may include all other entities in the communications system.

Herein two alternative embodiments including signaling mechanisms and data structures to establish and maintain a multicast distribution tree in a mobile multi-hop relay communication network are described. The number of relay hops and the number of RSs in a multi-hop relay network are relatively small so a centralized control mechanism is adopted wherein the MR-BS assigns the multicast connection ID, determines the structure of the multicast distribution tree. The information of the multicast distribution tree is then communicated to all the RSs that are included in the multicast distribution tree. The multicast routes/paths are established along the multicast distribution tree by the MR-BS so that the data SDUs/packets/frames can be forwarded along the multicast distribution tree branches from one source to multiple destinations based on the multicast connection ID. A multicast distribution tree may consist of multiple multicast routes/paths.

Real-time application support is important in the design of multi-hop wireless relay communication networks and, in particular, in wireless metropolitan area networks (MANs). Real-time applications, especially video distribution applications, demand a great deal of bandwidth. Unicast does not scale well for these types of applications. Due to the broadcast nature of a wireless network, multicast is an efficient way to distribute content in real-time to a group of users simultaneously. In the earlier patent application, Applicants taught a mechanism to establish a multicast tree in multi-hop relay wireless networks. The existing DSx* signaling mechanism to establish and maintain a multicast tree was used. The existing DSx* signaling mechanism, however, is not efficient for tree and connection management. For example, in the Path-CID-Binding-Update TLV data structure, where TLV represents the type, length and value in the DSA-REQ* signal, one or more CIDs can only be bound to one path in a single DSA-REQ* message. For multicast applications, each multicast application is assigned a multicast CID, the multicast CID may need to be bound to multiple paths that belong to a multicast tree. Using the existing DSA-REQ* signal, multiple DSA-REQ* signals/messages need to be sent to bind a single MCID to multiple paths, which may cause more bandwidth overhead and delay time. The present invention teaches not only a new set of DSx* signals/messages but also teaches a method and apparatus for using the new set of DSx* signals/messages. This new set of messages and the corresponding method and apparatus for their use improve the efficiency for MBS connection management.

A method is described including receiving multiple requests for a multicast service, generating parameters associated with binding paths to a multicast tree to provide the requested multicast service and binding the paths to the multicast tree. Also described is a method including receiving a request for multicast service with a multicast tree identification, binding the multicast tree identification to paths satisfying a quality of service level for the multicast tree identification and transmitting a first message to a multi-hop relay base station. A method is described including receiving requests to delete multicast service from client devices served by multiple paths, generating parameters associated with unbinding paths from a multicast tree to delete the multicast service and unbinding the paths from the multicast tree. Also described is a method including receiving a request to delete multicast service from client devices served by multiple paths, generating parameters associated with unbinding paths for which this relay station is not a leaf node and unbinding the paths from the multicast tree.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

FIG. 1 is a schematic diagram of an exemplary multi-hop relay communication system. In this example, MS1 and MS2 are connected to the MR-BS through RS1 and RS2, while MS3 and MS4 are connected to the MR-BS through RS1, RS3 and RS4. When one or more mobile node/station/device requires MBS, a multicast distribution tree is established, multicast SDUs/packets/frames are forwarded along the branches of the multicast distribution tree to the RS, to which MS nodes are associated. This RS may or may not be the last RS along a branch of the multicast distribution tree to the MSs. There may be multiple RSs along the path. The RSs further forwards the multicast SDUs to its associated MSs. A method is described herein to establish and maintain a multicast distribution tree that connects MR-BS and RSs using extended dynamic service (DSx*) messages such as DSA*, DSC*, DSD*.

In the multicast scheme of a wireless multi-hop relay communication system/network of the present invention, when a MS requests a unicast service, the unicast CID is assigned by the base station and is bound to a path through the signaling messages between the base station and relay stations/nodes along the path. This is not the case for the multicast. In multicast, a multicast CID (MCID) may be bound to multiple paths. Multiple paths form a multicast distribution tree. In addition, two or more MSs may request the same multicast service. When the first MS requests the multicast service, a MCID is assigned by the MR-BS and the path is bound to the MCID. However, when the other MSs request the same multicast service, the MCID does not need to be assigned. Furthermore, if the other MSs use the same path for this multicast service, the binding of the MCID and the path does not need to re-occur. Therefore, the establishment of multicast service and the establishment of unicast service are different. The method for establishing unicast service cannot be used for establishing multicast service. The present invention is for multicast, specifically, the method to establish and tear down the multicast service and the binding of MCID and path in the multicast distribution tree.

In FIG. 1, after RS1, RS2, RS3 and RS4 enter the network, MR-BS establishes the following paths:

P0={MR-BS}, P1={P0, RS1}, P2={P1, RS2}, P3={P1, RS3}, P4={P3, RS4}

When a MR-BS or a MS wants to initiate a multicast and broadcast service (MBS), the entity desiring to initiate MBS sends a DSA-REQ message to specify that it wants the MBS. Then a multicast distribution tree is established for this MBS. The method in accordance with the present invention for establishing multicast distribution tree is now described.

The present invention improves service flow efficiency and connection management. The present invention teaches additional fields to be added to the existing DSx* signals/messages/commands to allow a CID to be bound to and removed from multiple paths using a single DSx* message/command/signal. The MR-BS may send one message to bind a CID to multiple paths. The message contains the OD, the service flow parameters associated with the CID, the number of paths that this CID binds to, and the list of path IDs. The MR-BS sends the CID-Path binding message to the next/subordinate RS(s) on the path(s)/multicast tree. When a RS receives a OD-Path binding message, the RS processes the message, performs the operation as requested in the message, binds the CID with the path(s) if the RS belongs to the path(s). The RS then sends the message to the next RS(s) on the path(s) if it is not the last hop of the path(s). When the paths to be bound to the CID in the same message diverges in an RS, the RS separates the OD-Path binding commands into different messages and transmits them to each of the appropriate next-hop RSs in unicast. In an alternative embodiment, the RS may send the message to multiple next-hop RSs in broadcast or multicast. If a RS does not belong to any path in the received broadcast/multicast CID-Path binding message, it discards the message. This process continues until the message/command/signaling reaches the last RS on the path(s).

In an exemplary embodiment the following message fields are added to a DSx* message/signal/command for updating and removing bindings (CID to multiple paths). These fields can be added to the existing DSx* encoding as specified in Section 11.21 in the IEEE 802.16j draft standard.

CID-Path-Binding-Update TLV

This field contains a compound attribute whose sub-attributes identify a multicast CID or MCD, the service parameters that are associated with this OD and the paths that need to be bound to the CID as listed in Table 1.

| Type | Length | Value | Scope |
|---|---|---|---|
| TBD | variable | Compound | DSA-REQ* |

TABLE 1

MCID-Path-Binding-Addition Sub-attributes

| Attribute | Content |
|---|---|
| CID | The connection ID of a MBS connection |
| Service flow parameters | An list of service flow parameters associated with the CID bound to the paths |
| Number of path_IDs | The number of paths that this multicast CID need to be bound |
| List of path_IDs | An list of path_IDs that are bound to the CID |

CID-Path-Binding-Removal TLV

This field contains a compound attribute whose sub-attributes identify multicast CID, the path_IDs bound to the specified CID to be removed as listed in Table 2.

| Type | Length | Value | Scope |
|---|---|---|---|
| TBD | Variable | Compound | DSD-REQ* |

TABLE 2

MCID-Path-Binding-Removal Sub-attributes

| Attribute | Content |
|---|---|
| CID | The connection ID of a MBS connection |
| Number of path_IDs | The number of paths that this multicast CID bound need to be removed |
| List of path_IDs | An list of path_IDs that need to be removed from binding to the CID |

The following is an example of the usage of the new message fields. Still referring to FIG. 1, MS1 and MS2 are connected to MR-BS through path P2, MS3 and MS4 are connected to the MR-BS through path P4. If a MBS service is initiated for only one MS at a time, or if a MBS service is initiated for multiple MSs, but they all connected to the MR-BS using the same path, the existing DSA-REQ* message can be used to bind the multicast CID to the path that connect the MS(s) to the MR-BS. However, if MR-BS initiates a MBS service for multiple MSs simultaneously and these MSs are connected to the MR-BS using different paths, multiple DSA-REQ* messages need to be sent if the existing signaling/commands/messages are used. If a MBS is initiated for MS1 and MS3 at the same time, after a MCID is assigned to the MBS service, with the existing messages, the MR-BS need to send two DSA-REQ* messages, one sent out along P2 requesting RSs along P2 to bind the MCID with P2, another DSA-REQ* message is sent out along P4 requesting RSs along P4 to bind the MCID with P4. Two messages are sent between MR-BS and RS1.

When a MBS is initiated for MS1 and MS3 at the same time, and both P2 and P4 have not been added to the multicast tree, using the messages/signals/commands of the present invention, MR-BS sends out a DSA-REQ* message requesting the RSs along both paths P2 and P4 to bind the MCID to both P2 and P4. When RS1 receives the DSA-REQ*, it will bind the MCID to both P2 and P4. RS1 will also look into its routing table, and find that for path P2 the next hop is RS2, and for path P4 the next hop is RS3. RS1 then sends a DSA-REQ* message to RS2 requesting a binding between the MCID and P2 and a DSA-REQ* message to RS3 requesting a binding between the MCID and P4. RS3 also forwards the DSA-REQ message to R4. In this way, the DSA-REQ* is sent only once between MR-BS and RS1. In an alternative embodiment, RS1 will then send a DSA-REQ* message in broadcast/multicast to RS2 and RS3 with both paths P2 and P4 in the path list of the DSA-REQ* message. When RS2 receives the broadcast/multicast DSA-REQ* message, it finds that it is on the path P2 but not on the path P4. RS2 will bind MCID to P2. When RS3 receives the broadcast/multicast DSA-REQ* message, it finds that it is on path P4 and not on path P2. RS3 will bind the MCID to P4. Because RS3 is not a leaf RS node of P4, RS3 will delete P2 from the DSA-REQ* message, modify the number of paths in the DSA-REQ* message, and forward the DSA-REQ* message to RS4.

On the other hand, if the MBS service are terminated for both MS1 and MS3, and there are no other MSs associated with RS2 and RS4 requesting the MBS service, then MR-BS sends a DSD-REQ* message to RS1. In the DSD-REQ* message, the CID is the MCID of the MBS, the number of paths is 2, and the list of paths is P2 and P4. Upon receiving the message, RS1 removes the bindings between MCID and P2, and between MCID and P4. RS1 looks into its routing table, and finds that for P2 the next hop is RS2 and for P4 the next hop is RS3. RS1 then sends a DSD-REQ* message to RS2 requesting the removal of the binding between P2 and the MCID, and sends a DSD-REQ* message to RS3 requesting the removal of the binding between the MCID and P4. RS3 also forwards the DSD-REQ* to RS4. In an alternative embodiment, RS1 will then send a DSD-REQ* message in broadcast/multicast to RS2 and RS3 to request RS2 to unbind MCID to P2 and to request RS3 to unbind MCID to P4.

In another embodiment, multiple paths may be established for a unicast service flow/connection, which can be used for the purposes of diversity, mobile station handoff, protection, load balancing, etc. The methods in the present invention can be used for binding the unicast CID to multiple paths.

Figure 2:
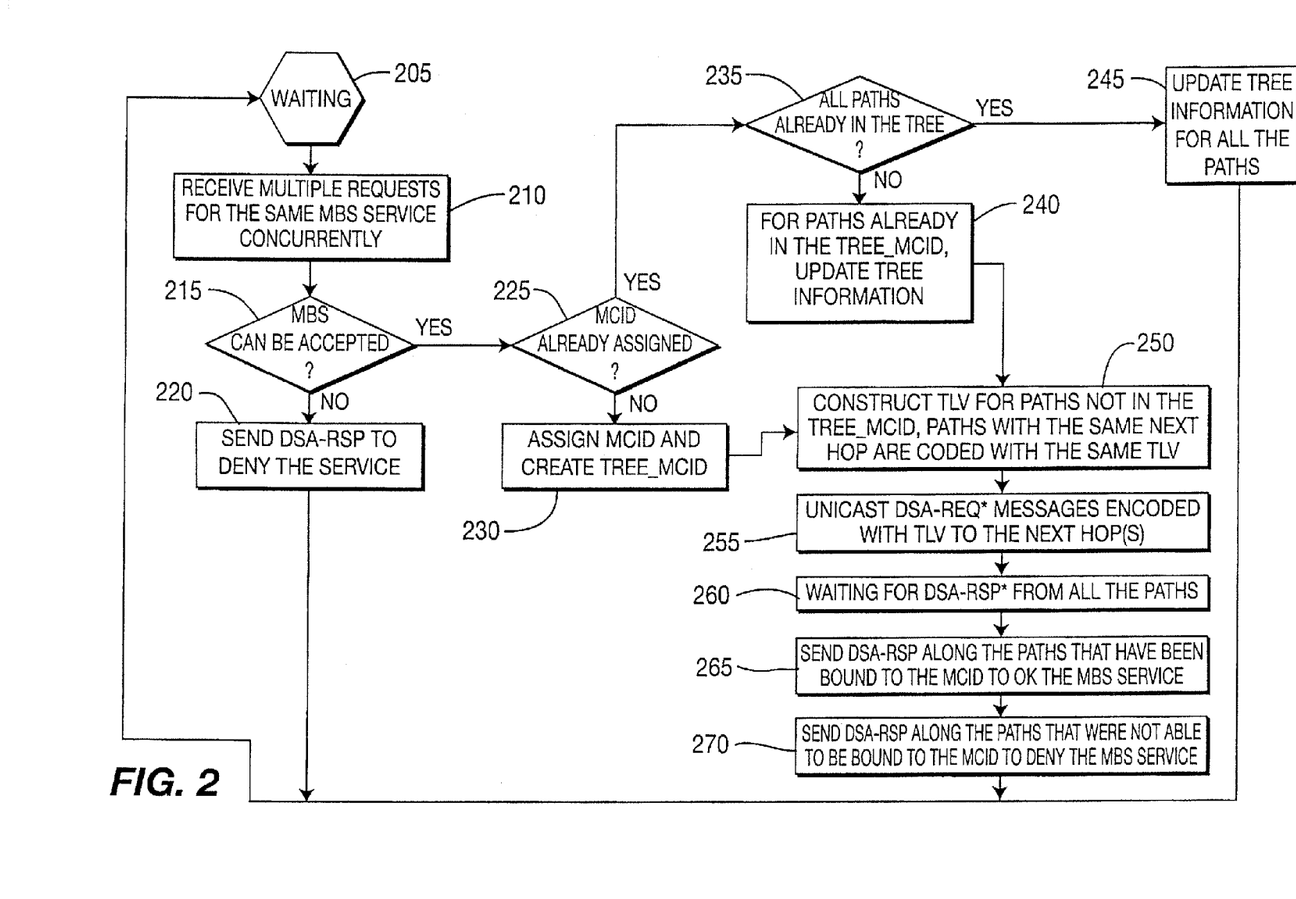
FIG. 2 is a flowchart of an exemplary embodiment of the present invention used at the MR-BS when multiple MBS requests are received concurrently.

FIG. 2 is a flowchart of an exemplary embodiment of the present invention used at the MR-BS when multiple MBS requests are received concurrently. As used herein "concurrently" means that the multiple MBS requests for the same service are received within a predetermined short time of each other, where the predetermined short time is a configuration parameter. At 205 the MR-BS is in a wait loop or wait state, waiting to receive a service request (DSA-REQ). Multiple requests for the same MBS are received concurrently at 210. That is, the service requests are received at close to or approximately at the same time such that the service requests can be serviced together. After receiving the first DSA-REQ message, the MR-BS may thus wait for a limited time for other DSA-REQ messages to arrive. A test is performed at 215 to determine if the request for MBS can be accepted. If the MBS cannot be accepted then a DSA-RSP is sent to the requester to deny the service at 220. If the MBS can be accepted then a test is performed at 225 to determine if an MCID has already been assigned. If a MCID has not yet been assigned then a MCID is assigned at 230 and a distribution tree is created. If a MCID has already been assigned then a test is performed at 235 to determine if all paths are already represented in the distribution tree. If all paths are not already represented in the distribution tree then for all paths already in the distribution tree the tree information is updated at 240. At 250 (following both 230 and 240), the distribution tree is updated with the paths not already represented in the distribution tree and the type, length and value information for those paths is constructed and coded. Paths with the same next hop are coded with the same type, length and value information. The DSA-REQ* messages encoded with the type, length and value information are unicast to their next hops at 255. The MR-BS then waits for DSA-RSP*s from the RSs from all of the distribution tree paths at 260. The MR-BS then sends its DSA-RSP down the paths (via the next hops (RSs)) that have been bound to the MCID to approve the MBS at 265 and sends its DSA-RSP down the paths (via the next hops (RSs)) that have been not been able to be bound to the MCID to deny the MBS at 270. The method then proceeds to 205. If all paths were already represented in the distribution tree then the tree information is updated at 245. The method then proceeds to 205.

Figure 3:
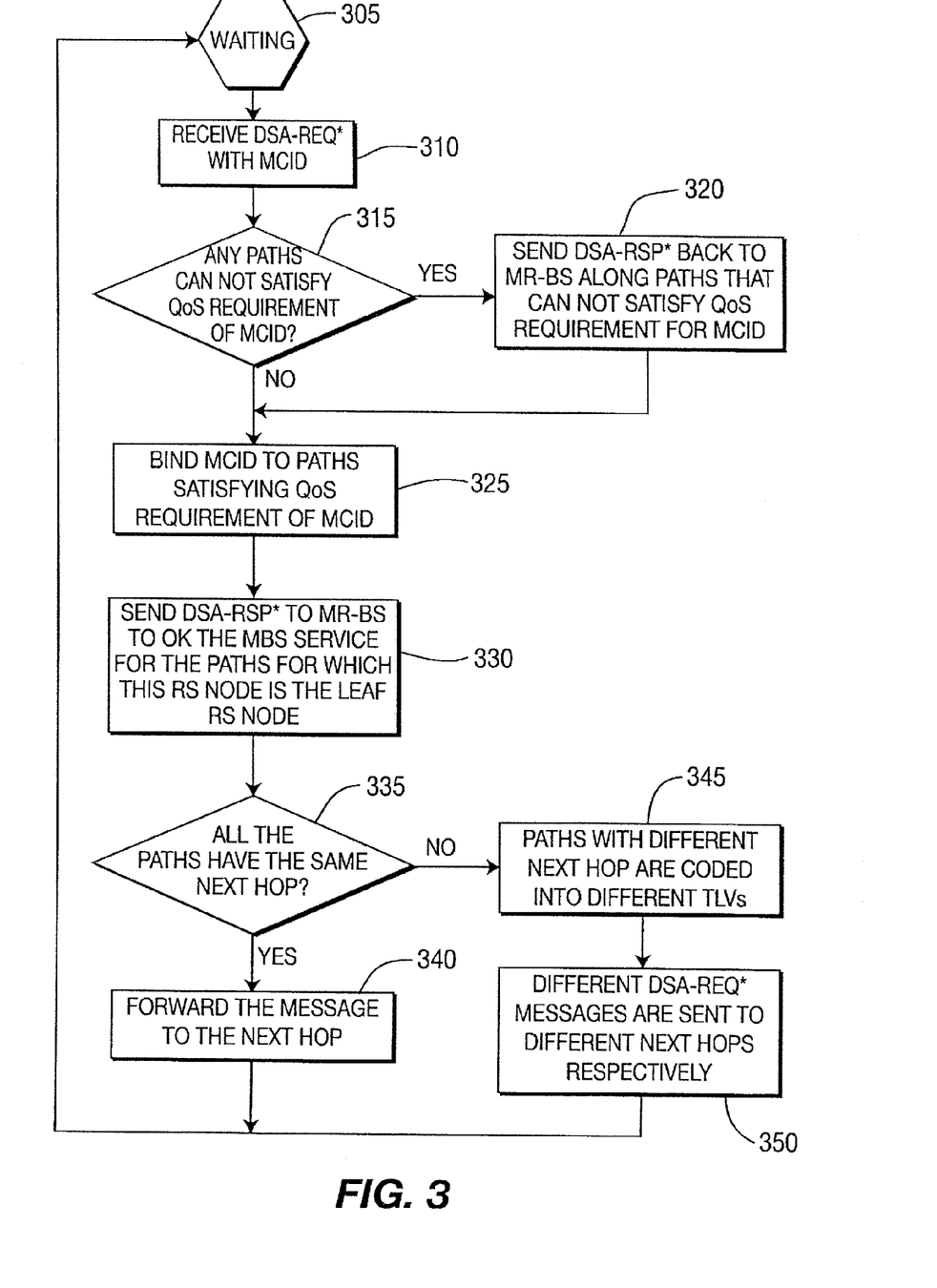
FIG. 3 is a flowchart of an exemplary embodiment of the present invention used at an RS when the RS has received a DSA-REQ* with the additional fields described herein.

FIG. 3 is a flowchart of an exemplary embodiment of the present invention used at an RS when the RS has received a DSA-REQ* with the additional fields described herein. At 305 the RS is in a wait loop or wait state, waiting to receive a service request. At 310 a service request (DSA-REQ*) with an MCID is received. A test is performed at 315 to determine if any paths do not satisfy the quality of service (QoS) requirements of the MCID. If one or more paths cannot satisfy the QoS requirements of the MCID then a DSA-RSP* is sent back to the MR-BS along the paths that cannot satisfy the QoS requirements at 320. The MCID is bound to the paths that can satisfy the QoS requirements at 325. A DSA-RSP* is sent to the MR-BS to ok the MBS for the paths for which this RS is the leaf node at 330. A test is performed at 335 to determine if all the paths have the same next hop. If all of the paths have the same next hop then the message is forwarded to the next hop and the method proceeds to 305. If all of the paths do not have the same next hop then the paths with different next hops are coded into different type, length and value fields of the DSA-REQ* message at 345 and the different DSA-REQ* messages are sent to their respective next hops at 350. The method then proceeds to 305.

Figure 4:
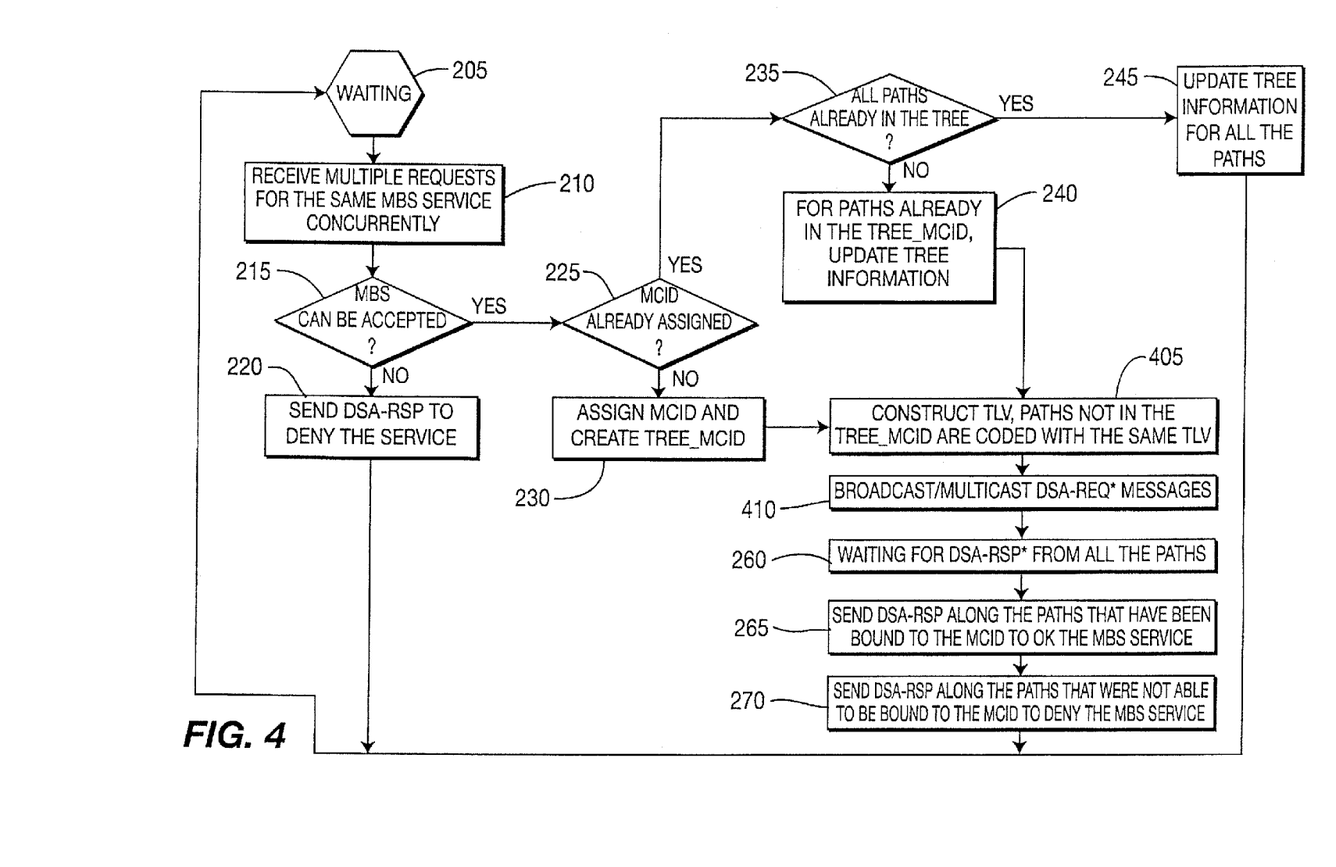
FIG. 4 is a flowchart of an alternative embodiment of the present invention used at the MR-BS when multiple MBS requests are received concurrently.

FIG. 4 is a flowchart of an alternative embodiment of the present invention used at the MR-BS when multiple MBS service requests are received concurrently. As used herein "concurrently" means that the multiple MBS requests for the same service are received within a predetermined short time of each other, where the predetermined short time is a configuration parameter. This flowchart is very similar to FIG. 2 and as such the processes and tests which are the same are numbered as in FIG. 2 and will not be described again. Only those processes which are new/different from those in FIG. 2 will be described. At 405, the type, length and value information is constructed/coded and paths not in the distribution tree are coded with the same type, length and value information.

At 410 the DSA-REQ* message is broadcast to all next hops (RSs) along all paths in the distribution tree.

Figure 5:
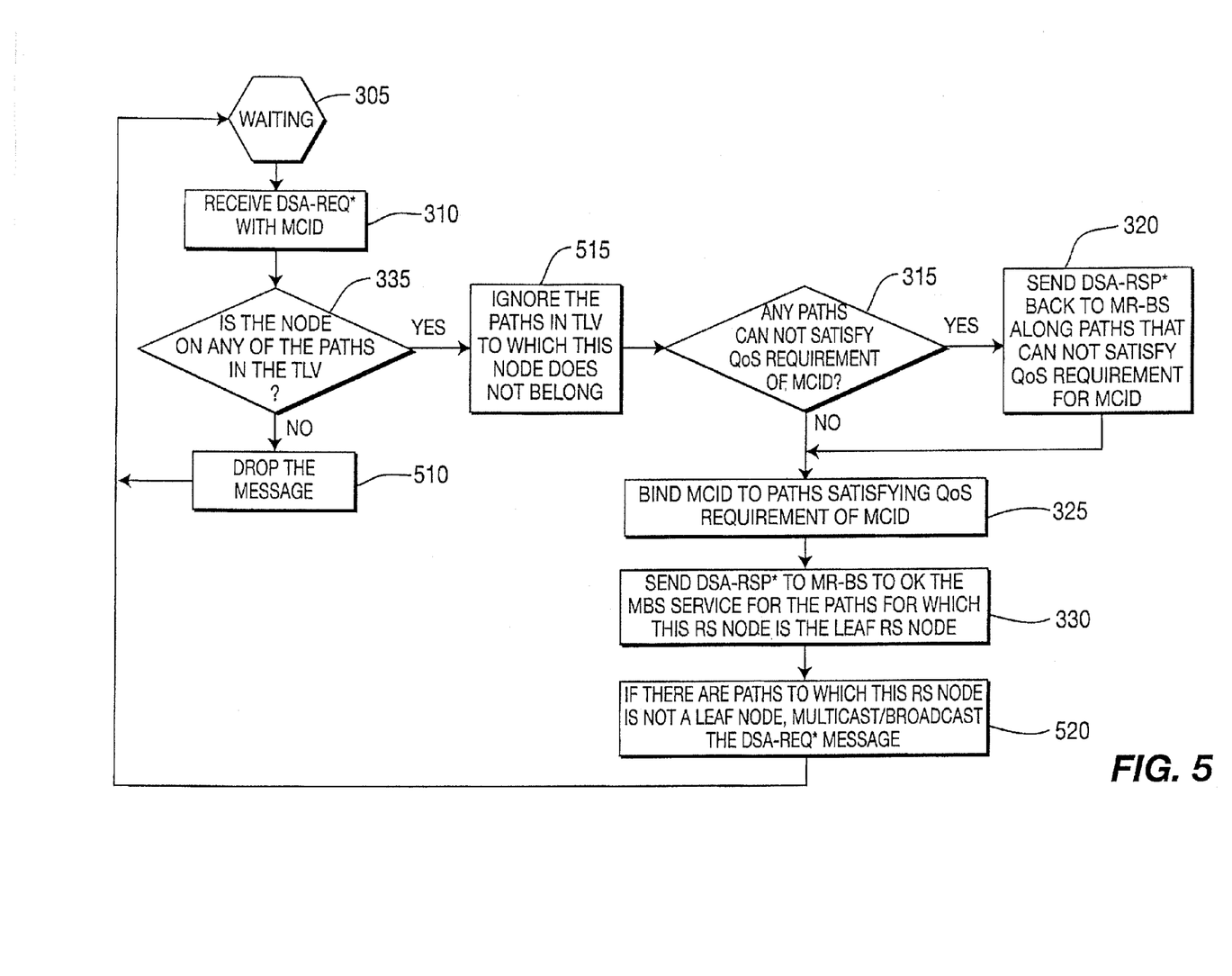
FIG. 5 is a flowchart of an alternative embodiment of the present invention used at an RS when the RS has received a DSA-REQ* with the additional fields described herein.

FIG. 5 is a flowchart of an alternative embodiment of the present invention used at an RS when the RS has received a DSA-REQ* with the additional fields described herein. This flowchart is very similar to FIG. 3 and as such the processes and tests which are the same are numbered as in FIG. 3 and will not be described again. Only those processes which are new/different from those in FIG. 3 will be described. At 505 a test is performed to determine if the node/RS is on any of the paths in the type, length value specified in the DSA-REQ* message; If the node/RS is not on any of the paths in the type, length value specified in the DSA-REQ* message, then the message is dropped at 510 and the method proceeds to 305. If the node/RS is on any of the paths in the type, length value specified in the DSA-REQ* message then the node/RS ignores the paths in the type, length and value fields of the DSA-REQ* message to which it does not belong at 515. At 520, the node/RS broadcasts the DSA-REQ* message to all next hops.

Figure 6:
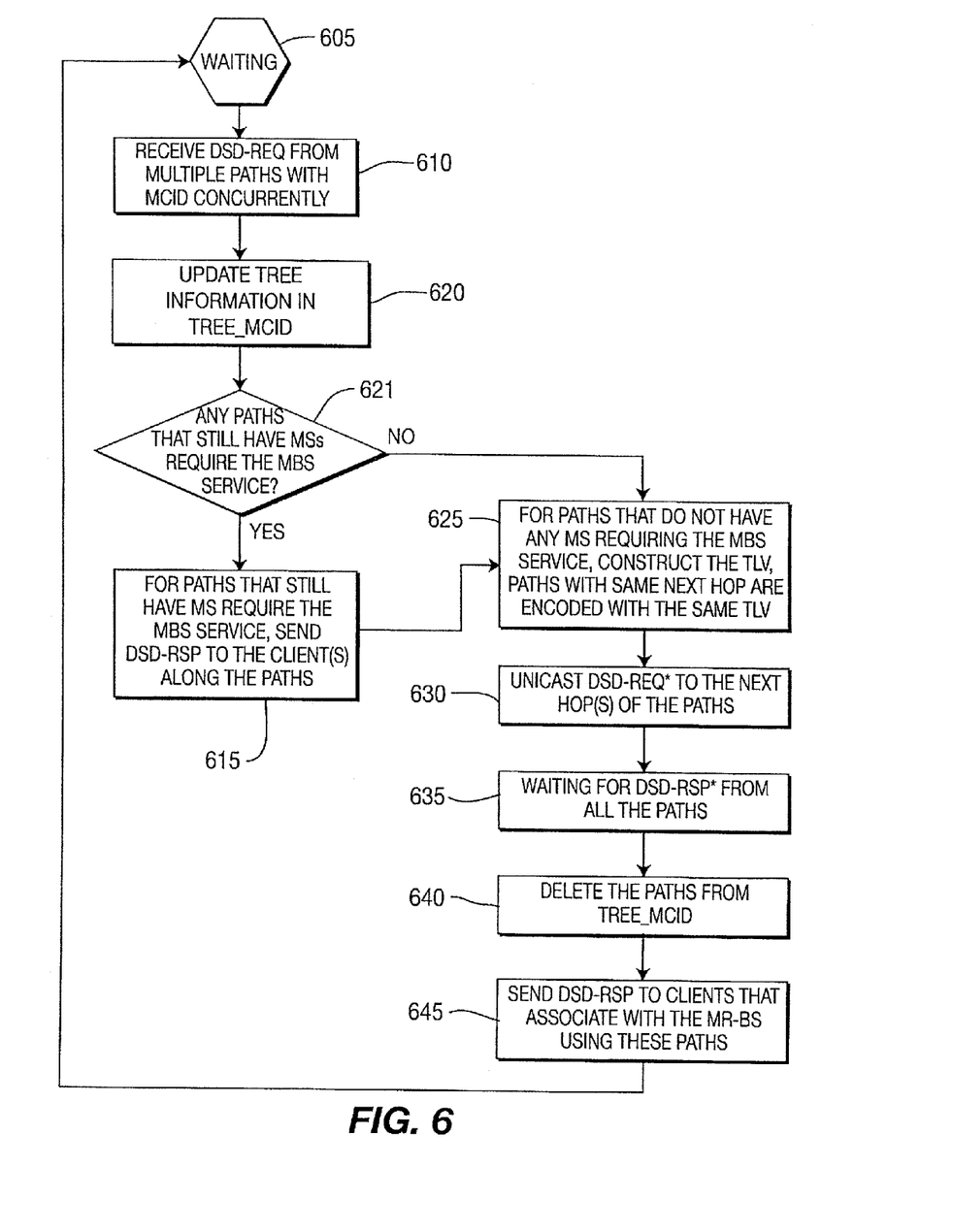
FIG. 6 is a flowchart of an exemplary embodiment of the present invention used at the MR-BS when multiple MBS requests are received concurrently.

FIG. 6 is a flowchart of an exemplary embodiment of the present invention used at the MR-BS when multiple MBS requests are received concurrently. As used herein "concurrently" means that the multiple MBS requests for the same service are received within a predetermined short time of each other, where the predetermined short time is a configuration parameter. At 605 the MR-BS is in a wait loop or wait state, waiting to receive a service request (DSD-REQ). After receiving the first DSD-REQ message, a MR-BS may thus wait a limited time for other DSD-REQ messages to arrive. At 610 the MR-BS receives DSD-REQ requests from multiple paths with a common MCID. The tree information is updated in the distribution tree at 620. A test is performed at 621 to determine if there are any paths that still have MSs that require the MBS. At 625, for paths that do not have any MSs that still require the MBS, then the type, length and value fields are constructed/coded and the paths with the same next hop are encoded with the same type, length and value fields. For paths that still have MSs that require the MBS, a DSD-RSP is sent to the clients along the paths (via the RS) at 615. The DSD-REQ* is unicast to the next hops of the paths. The MR-BS waits for DSD-RSP* from all of the paths at 635. At 640 the paths in the DSD-REQ message are deleted. DSD-RSP messages are sent to the clients (MSs) associated with the MR-BS that were using the now deleted paths. The DSD-RSP is sent to clients (MSs) that associate with the MR-BS using these paths at 645.

Figure 7:
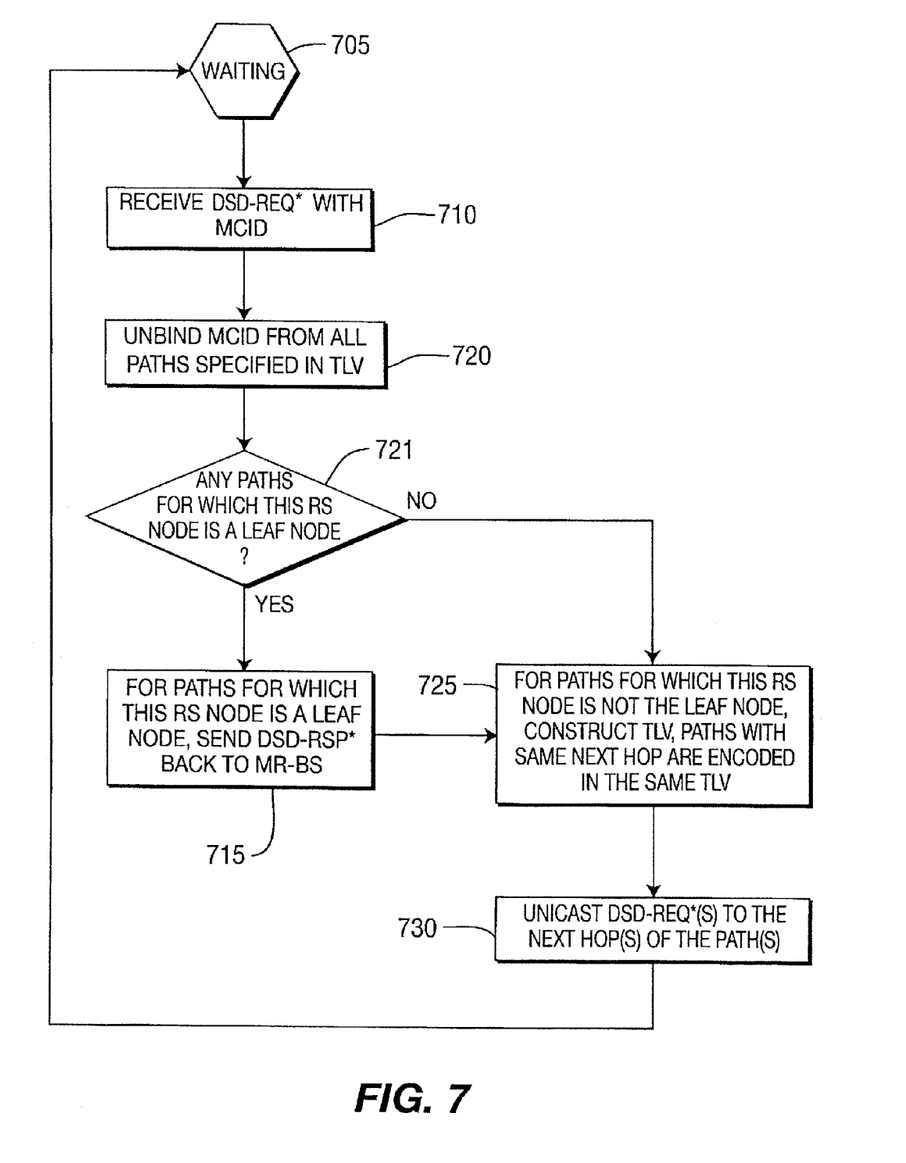
FIG. 7 is a flowchart of an exemplary embodiment of the present invention used at an RS when the RS has received a DSD-REQ* with the additional fields described herein.

FIG. 7 is a flowchart of an exemplary embodiment of the present invention used at an RS when the RS has received a DSD-REQ* with the additional fields described herein. At 705 the RS is in a wait loop or wait state, waiting to receive a service request. At 710, the RS receives a DSD-REQ* message/request from multiple paths with a common MCID. At 720, the RS unbinds the MCID from all paths specified in the type, length and value fields of the message. A test is performed at 721 to determine if there are any paths for which this RS node is a leaf node. At 715, for paths for which this is a leaf node, the RS sends a DSD-RSP* message back to the MR-BS. At 725, for the paths for which this RS node is not a leaf node, the type, length and value fields are constructed/coded and the paths with the same next hop are encoded with the same type, length and value information. At 730, the DSD-REQ* messages are unicast to the next hops (RSs) along the paths.

Figure 8:
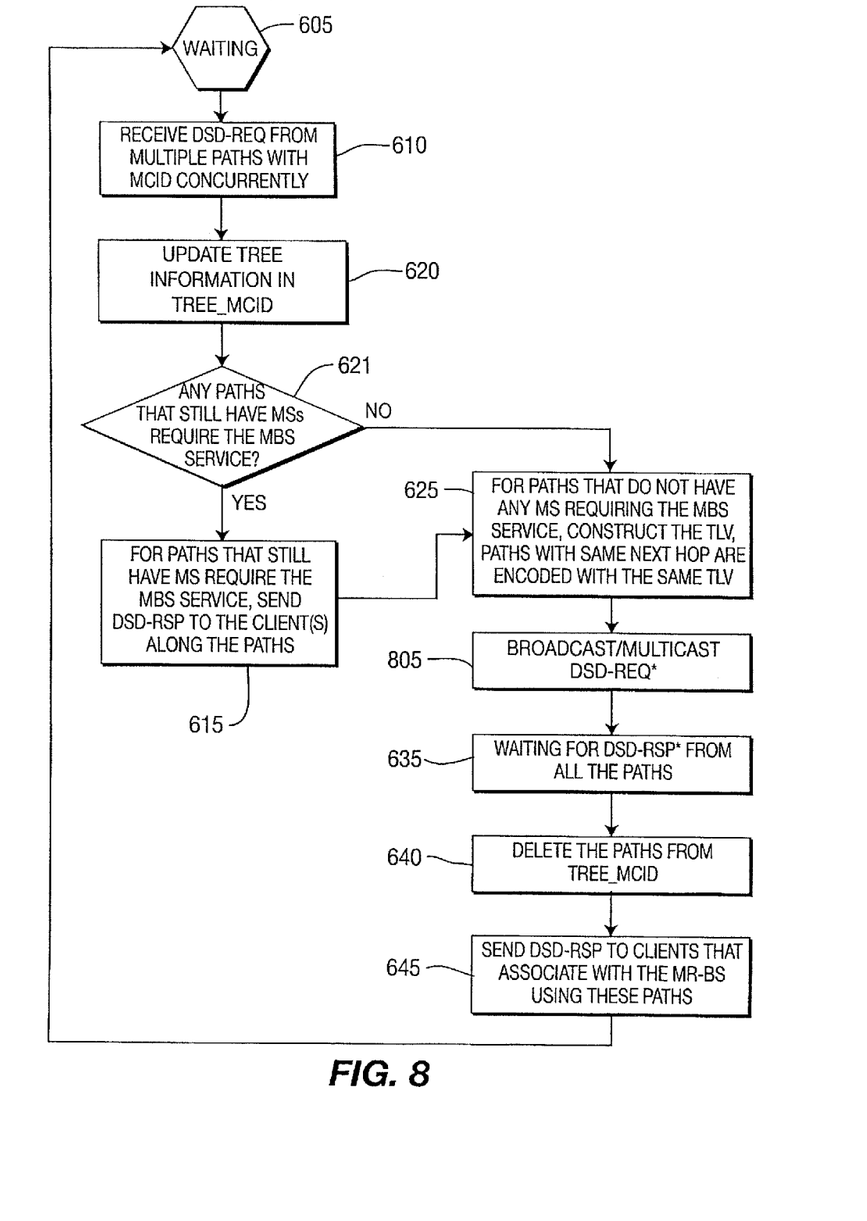
FIG. 8 is a flowchart of an alternative embodiment of the present invention used at the MR-BS when multiple MBS requests are received concurrently.

FIG. 8 is a flowchart of an alternative embodiment of the present invention used at the MR-BS when multiple MBS requests are received concurrently. As used herein "concurrently" means that the multiple MBS requests for the same service are received within a predetermined short time of each other, where the predetermined short time is a configuration parameter. This flowchart is very similar to FIG. 6 and as such the processes and tests which are the same are numbered as in FIG. 6 and will not be described again. Only those processes which are new/different from those in FIG. 6 will be described. At 805, for paths that do not have any MSs requiring the MBS service, the type, length and value fields are constructed/coded and all paths are encoded with the same type, length and value fields.

Figure 9:
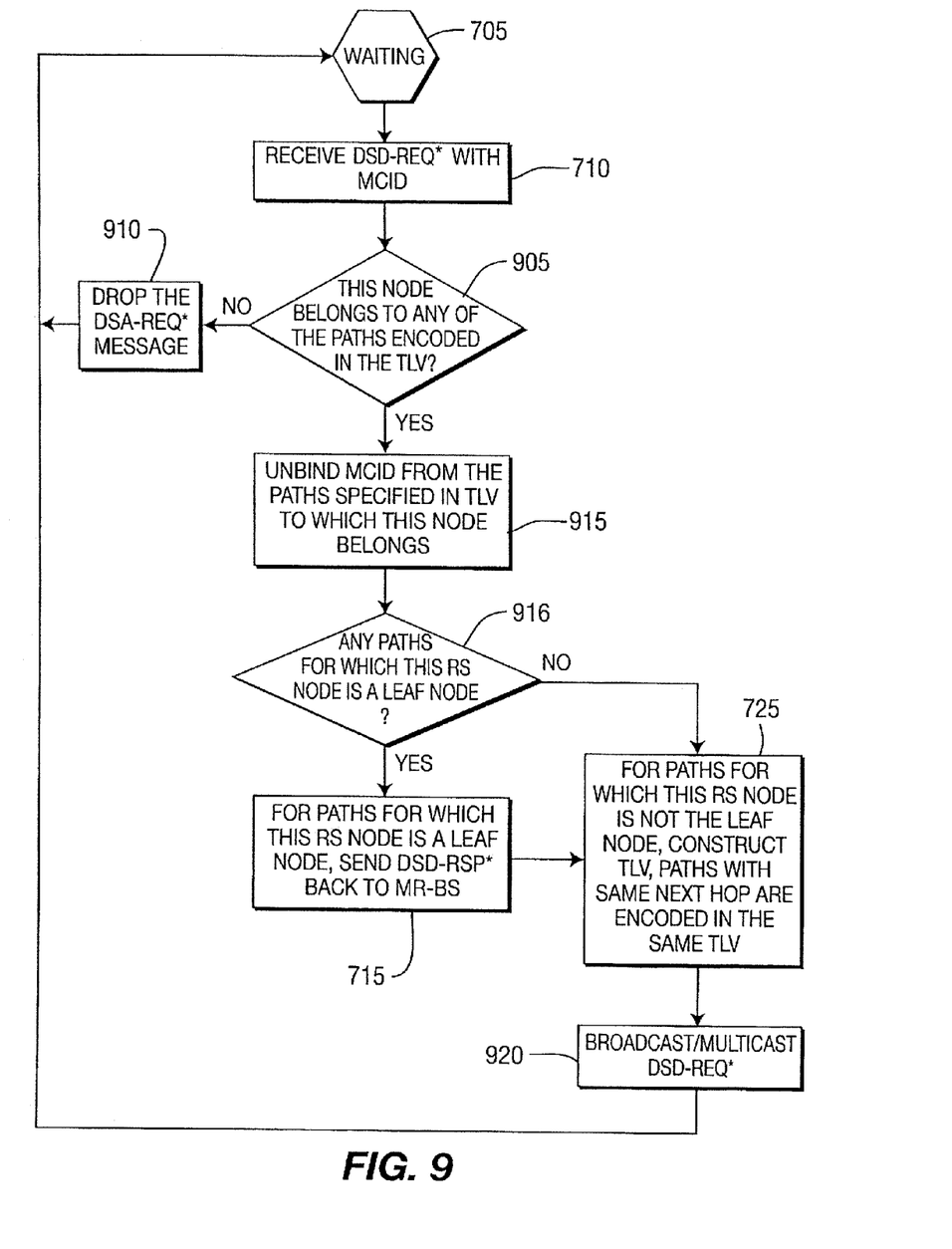
FIG. 9 is a flowchart of an alternative embodiment of the present invention used at an RS when the RS has received a DSD-REQ* with the additional fields described herein.
Figure 10:
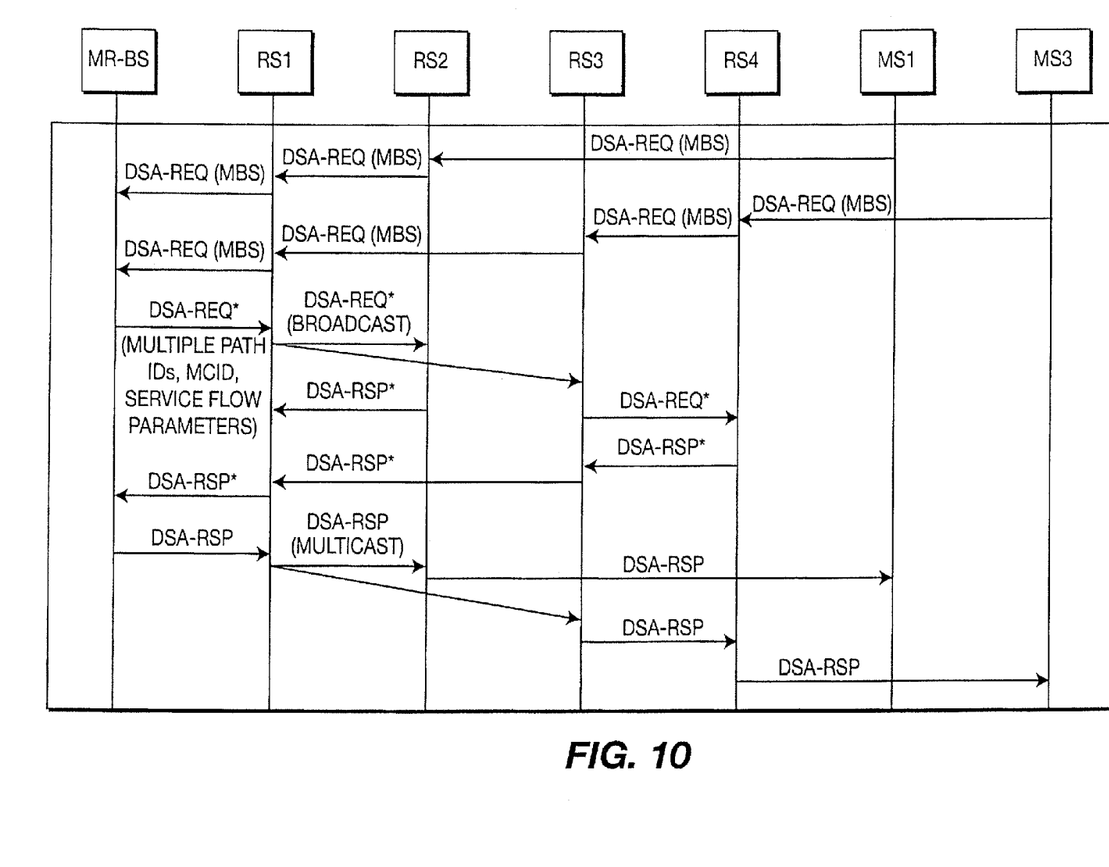
FIG. 10 is a "ladder" diagram showing the sequence of the messages exchanged between the MR-BS and the various nodes/RSs shown in FIG. 1 when adding multiple paths to a multicast distribution tree.

FIG. 9 is a flowchart of an alternative embodiment of the present invention used at an RS when the RS has received a DSD-REQ* with the additional fields described herein. This flowchart is very similar to FIG. 7 and as such the processes and tests which are the same are numbered as in FIG. 7 and will not be described again. Only those processes which are new/different from those in FIG. 7 will be described. At 905, a test is performed to determine if the node/RS belongs to any of the paths encoded with the type, length and value information in the fields of the message. If none of the paths are so encoded then the DSD-REQ* message is dropped at 910. At 915, the MCID is unbound from the paths specified in the type, length and value fields to which this node/RS belongs. A test is performed at 916 to determine if there are any paths for which this RS node is a leaf node. At 920, the DSD-REQ* message is broadcast along the paths FIG. 10 is a "ladder" diagram showing the sequence of the messages exchanged between the MR-BS and the various nodes/RSs shown in FIG. 1 when adding multiple paths to a multicast distribution tree. MS1 sends a DSA-REQ to RS2 requesting MBS. RS2 forwards MS1's request to RS1, which in turn forwards MS1's request to MR-BS. Concurrently, MS3 sends a DSA-REQ to RS4 requesting MBS. RS4 forwards MS3's request to RS3, which in turn forwards MS3's request to RS1. RS1 then forwards MS3's request to MR-BS. MR-BS processes both MS1's request and MS3's request as set forth in FIGS. 2 and 4 and sends a DSA-REQ* message to RS1. RS1 broadcasts or multicasts the DSA-REQ* message to both RS2 and RS3. RS2 sends RS1 a DSA-RSP* and RS3 sends the DSA-REQ* to RS4. RS4 responds by sending a DSA-RSP* to RS3, which in turn forwards the DSA-RSP* from RS4 to RS1. RS1 then forwards the DSA-RSP* for both RS2 and RS4 to MR-BS. MR-BS processes both RS2's response (DSA-RSP*) and RS4's response (DSA-RSP*) as set forth in FIGS. 2 and 4 and sends a DSA-RSP message to RS1. RS1 multicasts or broadcasts the DSA-RSP message to both RS2 and RS3. RS2 sends the DSA-RSP message to MS1 and RS3 sends the DSA-RSP message on to RS4, which in turn sends the DSA-RSP message on to MS3.

Figure 11:
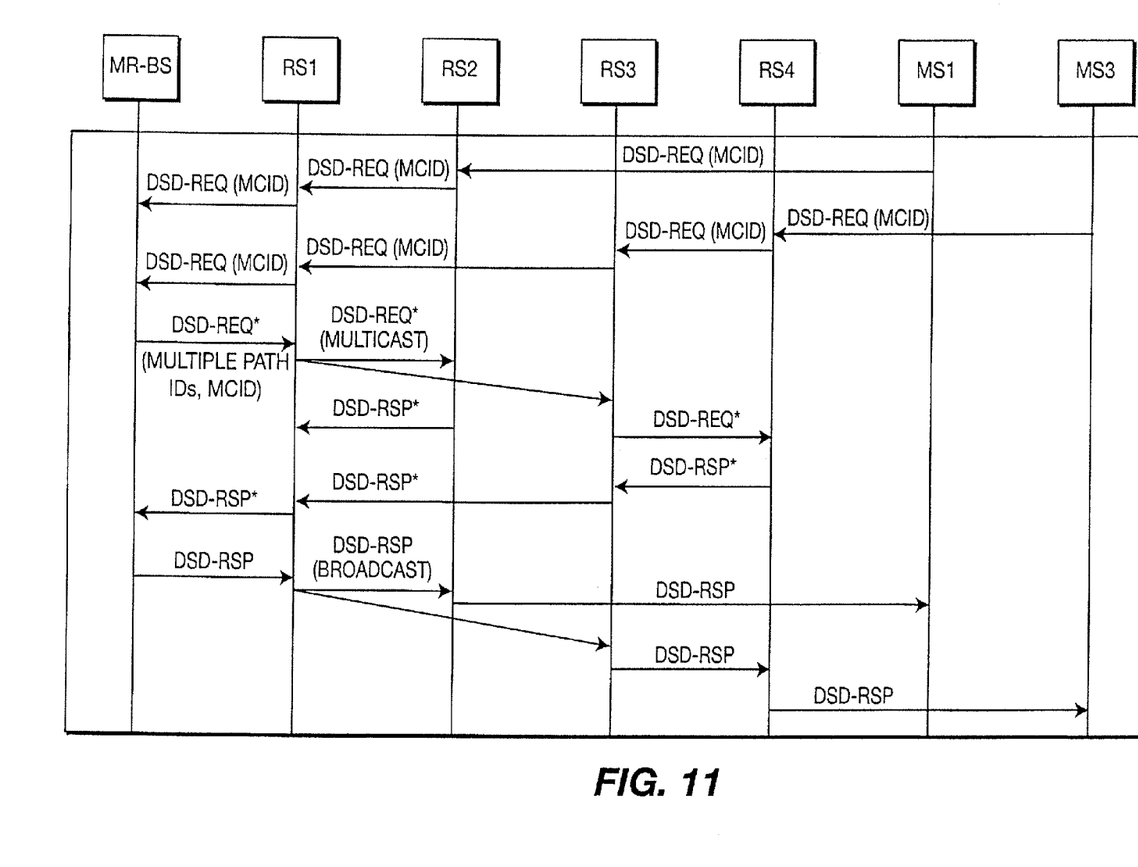
FIG. 11 is a "ladder" diagram showing the sequence of the messages echanged between the MR-BS and the various nodes/RSs shown in FIG. 1 when deleting multiple paths to a multicast distribution tree.

FIG. 11 is a "ladder" diagram showing the sequence of the messages exchanged between the MR-BS and the various nodes/RSs shown in FIG. 1 when deleting multiple paths to a multicast distribution tree. MS1 sends a DSD-REQ message with a MCID to RS2 which forwards the message to RS1, which in turn forwards the message to MR-BS. Concurrently, MS3 sends a DSD-REQ message with a MCID to RS4, which forwards the message to RS3. RS3 then forwards the message to RS1, which in turn forwards the message to MR-BS. MR-BS processes both MS1's request and MS3's request as set forth in FIGS. 6 and 8 and sends a DSD-REQ* message to RS1. RS1 broadcasts or multicasts the DSD-REQ* message to both RS2 and RS3. RS2 sends RS1 a DSD-RSP* and RS3 sends the DSD-REQ* to RS4. RS4 responds by sending a DSD-RSP* to RS3, which in turn forwards the DSD-RSP* from RS4 to RS1. RS1 then forwards the DSD-RSP* for both RS2 and RS4 to MR-BS. MR-BS processes both RS2's response (DSD-RSP*) and RS4's response (DSD-RSP*) as set forth in FIGS. 6 and 8 and sends a DSD-RSP message to RS1. RS1 multicasts or broadcasts the DSD-RSP message to both RS2 and RS3. RS2 sends the DSD-RSP message to MS1 and RS3 sends the DSD-RSP message on to RS4, which in turn sends the DSD-RSP message on to MS3.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method in a wireless multi-hop relay network, said method comprising:
receiving multiple requests for a multicast service;
generating parameters associated with binding paths to a multicast tree to provide said requested multicast service, wherein parameters include a multicast connection identification; and
binding said paths to said multicast tree using said multicast connection identification, wherein said binding further comprises one of unicasting and multicasting a first message including said generated parameters to a relay station along said paths, wherein said parameters also include parameters for said multicast connection identification, a number of paths to which said multicast connection identification is to be bound and a list of paths to which said multicast connection identification is to be bound.

2. The method according to claim 1, further comprising:
determining if said requests for multicast service can be accepted;
determining if a multicast tree identification has already been assigned, if said requests for multicast service can be accepted;
determining if all paths are already in a multicast tree, if said multicast tree identification has already been assigned;
updating tree information for all paths already in said multicast tree;

updating tree information for paths in said multicast tree; and receiving a second message from said relay station.

3. The method according to claim 2, further comprising sending a third message to said relay station for forwarding along all paths that have been bound to said multicast connection identification accepting said request for multicast service.

4. The method according to claim 2, further comprising sending a third message to said relay station for forwarding along all paths that have not been bound to said multicast connection identification denying said request for multicast service.

5. The method according to claim 2, further comprising denying said request for multicast service, if said multicast service cannot be accepted.

6. The method according to claim 2, further comprising:
assigning said multicast tree identification, if said multicast tree identification was not already assigned; and
creating said multicast tree.

7. The method according to claim 1, wherein said method is performed in a multicast relay base station.

8. The method according to claim 1, further comprising:
receiving a multicast tree identification with said requests for multicast service;
binding said multicast tree identification to paths satisfying a quality of service level for said multicast tree identification; and
transmitting a first message to a multi-hop relay base station.

9. The method according to claim 8, wherein said first message is sent for paths for which a relay station that transmitted said first message is a leaf node.

10. The method according to claim 8, further comprising:
determining if there are any paths that cannot satisfy said quality of service level of said multicast tree identification; and
transmitting said first message to said multicast relay base station along paths that cannot satisfy said quality of service level of said multicast tree identification.

11. The method according to claim 10, further comprising:
determining if all paths have a same next relay station;
forwarding said first message to said same next relay station, if all paths have said same next relay station;
coding information including a multicast connection identification, parameters for said multicast connection identification, a number of paths to which said multicast connection identification is to be bound and a list of paths to which said multicast connection identification is to be bound into different data structures for paths having different next relay stations; and
transmitting different second messages along paths with different next relay stations.

12. The method according to claim 10, further comprising multicasting a second message to a next relay station, if there are paths for which a relay station that transmitted said first message is not a leaf node.

13. The method according to claim 12, further comprising:
determining if said relay station that transmitted said first message is on any of the paths specified in said request for multicast service;
dropping said request for multicast service, if said relay station is not on any of the paths specified in said request for multicast service; and
ignoring any paths to which said relay station is not on any of the paths specified in said request for multicast service.

14. The method according to claim 8, wherein said method is performed by a relay station.

15. A method in a wireless multi-hop relay network, said method comprising:
receiving requests to delete multicast service from client devices served by multiple paths;
generating parameters associated with unbinding paths from a multicast tree to delete said multicast service, wherein parameters include a multicast connection identification; and
unbinding said paths from said multicast tree using said multicast connection identification, wherein said unbinding further comprises one of unicasting and multicasting a first message including said generated parameters to a relay station along said paths, wherein said parameters also include parameters for said multicast connection identification, a number of paths to which said multicast connection identification is to be unbound and a list of paths to which said multicast connection identification is to be unbound.

16. The method according to claim 15, further comprising:
updating tree information for paths in a multicast tree;
determining if there are any paths that still have client devices requiring said multicast service; and
transmitting a second message to said relay station for forwarding along paths that still require said multicast service.

17. The method according to claim 16, further comprising:
receiving said second message from said relay station;
deleting paths having no client devices still requiring said multicast service from said multicast tree; and
transmitting a third message to client devices that were using said deleted paths.

18. The method according to claim 15, wherein said method is performed by a multicast relay base station.

19. The method according to claim 15, further comprising:
generating parameters associated with unbinding paths for which a relay station that transmitted said first message is not a leaf node.

20. The method according to claim 19, wherein said unbinding further comprises one of unicasting and multicasting a first message including said generated parameters to said relay station along said paths.

21. The method according to claim 20, wherein said request to delete said multicast service includes a multicast tree identification.

22. The method according to claim 21, further comprising:
unbinding said multicast tree identification from all paths specified in said requests to delete multicast service;
determining if there are any paths for which said relay station is a leaf node; and
transmitting a second message to a multicast relay base station for which said relay station is a leaf node.

23. The method according to claim 21, further comprising:
determining if said relay station belongs to any of the paths specified in the requests to delete multicast service;
unbinding said multicast tree identification from all paths specified in said requests to delete multicast service;
determining if there are any paths for which said relay station is a leaf node; and
transmitting a second message to a multicast relay base station for which said relay station is a leaf node.

24. The method according to claim 19, wherein said method is performed by said relay station.

* * * * *